United States Patent

[11] 3,609,522

| [72] | Inventors | Roger W. Hutchins<br>Islington, Ontario;<br>Herman Reddering, Agincourt, Ontario,<br>both of Canada |
|---|---|---|
| [21] | Appl. No. | 840,429 |
| [22] | Filed | July 9, 1969 |
| [45] | Patented | Sept. 28, 1971 |
| [73] | Assignee | Huntec (70) Limited<br>Toronto, Ontario, Canada |

[54] HORIZONTAL LOOP ELECTROMAGNETIC PROSPECTING SYSTEM WITH TEMPERATURE COMPOSITION
15 Claims, 10 Drawing Figs.

[52] U.S. Cl. .................................................. 324/6
[51] Int. Cl. .................................................. G01v 3/10
[50] Field of Search .......................................... 324/6, 4

[56] References Cited
UNITED STATES PATENTS

| 2,887,650 | 5/1959 | Ruddock et al. | 324/6 |
| 2,995,699 | 8/1961 | Snelling et al. | 324/6 X |
| 3,015,060 | 12/1961 | McLauglin et al. | 324/6 X |
| 3,105,190 | 9/1963 | Norris | 324/6 |
| 3,108,220 | 10/1963 | Ruddock | 324/6 |
| 3,123,766 | 3/1964 | Ruddock et al. | 324/4 |
| 3,214,686 | 10/1965 | Elliot et al. | 324/6 |

*Primary Examiner*—Gerard R. Strecker
*Attorney*—Rogers, Bereskin & Parr

ABSTRACT: An absolute reading horizontal loop electromagnetic prospecting system in which the transmitted field is sampled by a reference coil concentric with and inductively coupled to the transmitter coil. The resultant reference voltage is used to adjust transmitter gain to keep transmitter output temperature independent. The receiver contains concentric, inductively coupled receiver and compensation coils, with a self-nulling servoloop connected between them employing in-phase and out-of-phase reference signals generated using the transmitter reference voltage. The servoloop detects the in-phase and out-of-phase components of the received signal, integrates them, and feeds the in-phase and out-of-phase components of the integrated signals into the compensation coil, with a free space compensation signal, to null the received signal. A digital voltmeter measures, through an optional long time constant filter, the size of the integrated signals to indicate the in-phase and out-of-phase components of the received signal.

INVENTORS
ROGER W. HUTCHINS
HERMAN REDDERING

BY Rogers, Bereskin, & Parr

HORIZONTAL LOOP ELECTROMAGNETIC PROSPECTING SYSTEM WITH TEMPERATURE COMPOSITION

This invention relates to a horizontal loop electromagnetic prospecting system.

In horizontal loop electromagnetic prospecting systems, it is usual to excite a transmitting coil with an alternating current, and to examine the field received by a receiving coil spaced from the transmitting coil. Both coils are usually maintained in the same horizontal plane during this process. If there is a buried ore body in the vicinity, the primary field generated by the transmitting coil will induce eddy currents in the ore body, thus causing the ore body to radiate a secondary electromagnetic field. This secondary field generated by the ore body contains a component that is in time phase with the primary field, and a component that is 90° out of time phase with the primary transmitted field. The magnitude of the in-phase and out-of-phase components of the secondary field in a direction parallel to the axis of the receiving coil is measured at the receiver and provides information as to the size and nature of the ore body.

Conventional horizontal loop electromagnetic prospecting systems have in the past provided only a relative measurement of the in-phase and out-of-phase components of the secondary field. It has been difficult to relate these relative measurements in any precise way to the absolute values of these components. In addition, in conventional systems, measurements have been made manually by an operator, who must himself make adjustments until a null value is reached and then take a reading. Because of the presence of noise and the weakness of the received signal, particularly at high separations of the transmitter and receiver coils, the measurement procedure has been very slow and imprecise.

Accordingly, it is an object of the present invention in one of its aspects to provide a horizontal loop electromagnetic prospecting system that provides readings of the in-phase and out-of-phase components of the secondary field that can readily be related to the absolute values of these components. In the system according to the invention, the transmitted field amplitude is maintained independent of temperature, and at the receiver, a free space signal is generated representative of the calculated free space field at the receiver and is fed into a compensation coil inductively coupled to the receiver call to oppose the received signal. The in-phase and out-of-phase components of the remaining received signal can then readily be related to the absolute values of the in-phase and out-of-phase components of the received field.

In the preferred embodiment of the invention, the free space compensation signal is generated using only a phase reference provided from the receiver, thus eliminating the need for transmitting an amplitude reference to the receiver. The preferred embodiment further includes a self-nulling servo system which automatically nulls the received signal without requiring the operator to form part of the measurement loop, thus increasing measurement speed and accuracy. Readings are preferably displayed on a digital voltmeter and in the preferred embodiment can be made extremely accurate by insertion of a long time constant filter in series with the voltmeter to reduce fluctuations in the display.

Further objects and advantages of the invention will appear from the following description, taken together with the accompanying drawings, in which:

FIG. 9 is a graph showing a voltmeter reading made by the system of the invention when the system is turned on.

Figure 1:
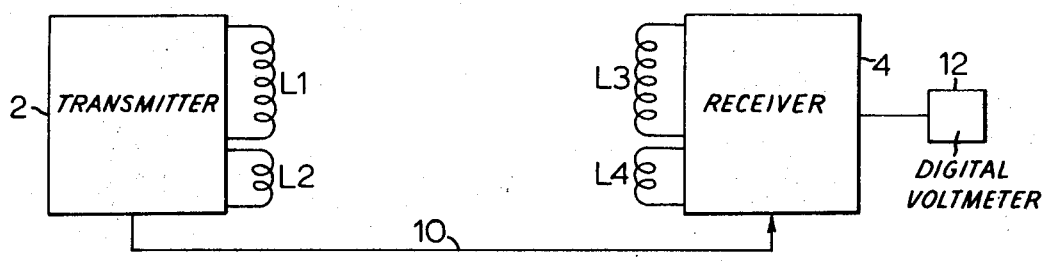
FIG. 1 is a block diagram of a complete system according to the invention.

The system shown in FIG. 1 includes a transmitter 2 having a transmitter coil L1 and a reference coil L2, and a receiver 4 having a receiving coil L3 and a compensation coil L4. The transmitter coil L1 can be considered to be a magnetic dipole at distances greater than a few coil diameters, with dipole (magnetic) moment being the product of the number of turns, the coil area, and the current through the coil.

Figure 2:
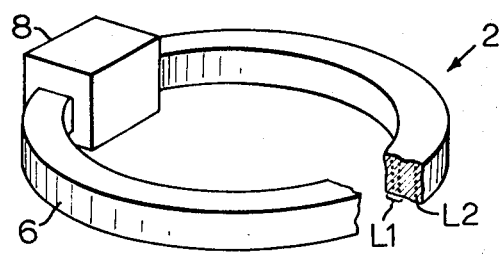
FIG. 2 is a perspective view, partly cut away, showing the physical appearance of the receiver of FIG. 1.

The physical appearance of the transmitter is shown in FIG. 2, where the coil L1 is shown with coil L2 wound concentrically around it, and with both encased in a circular housing 6 having a generally rectangular instrument housing 8 attached thereto. The physical appearance of the receiver 4 is the same as that of the transmitter, except of course for different controls (not shown) on its instrument housing. The receiver 4 also includes in its instrument housing a digital voltmeter 12 on which either in-phase or out-of-phase readings can be made as selected by the operator. The receiver compensation coil L4 is wound concentrically with the receiver coil L3 in the same manner as shown for the transmitter coils. The coils are all potted in resin and are enclosed by Faraday shields to reduce the effect of stray capacitances.

Figure 3:
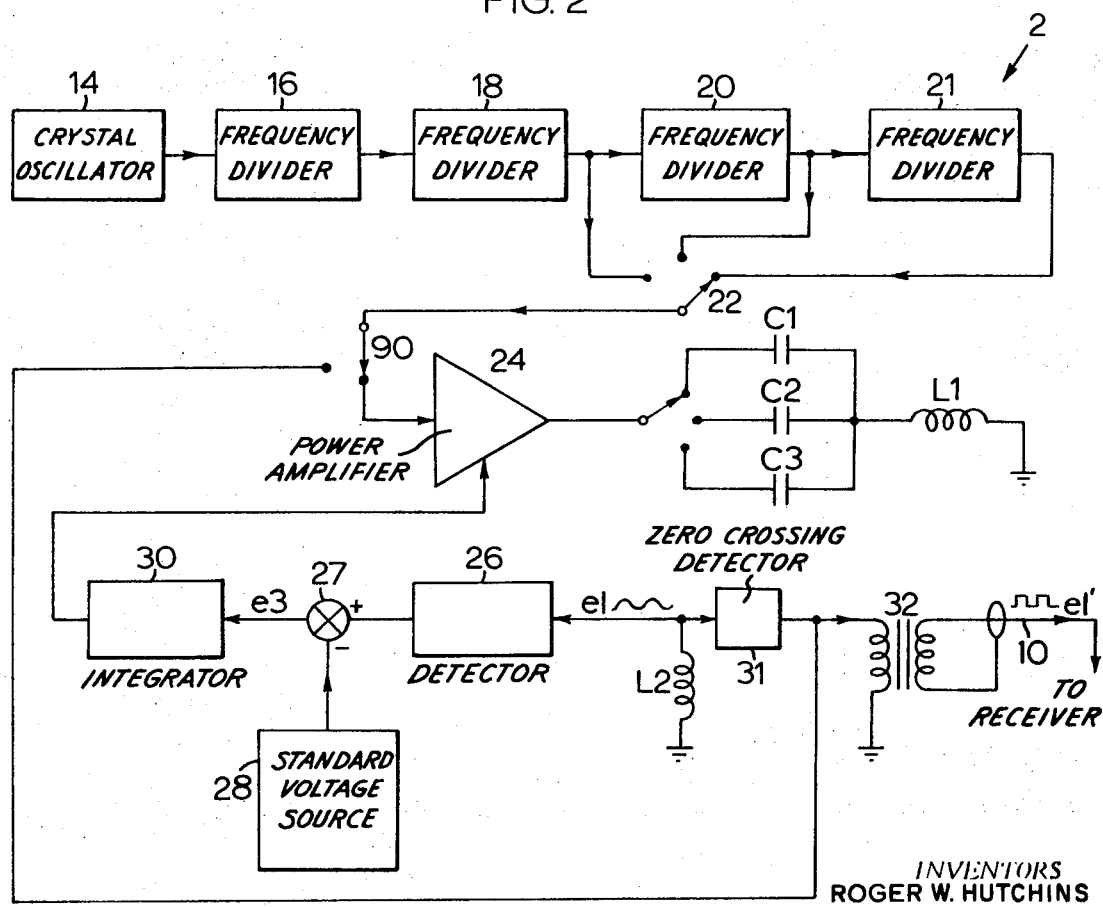
FIG. 3 is a block diagram of the transmitter of FIG. 1.

Reference is next made to the transmitter block diagram of FIG. 3. As shown, the transmitter includes a crystal oscillator 14 having an output at a frequency of 64 kHz. (the figures given are purely illustrative). The output of the oscillator 14 is divided by 16 in a frequency divider 16, and is then successively divided by two in a chain of three frequency dividers 18, 20, 21 to give three available outputs at 2kHz. 1 kHz. and 0.5 kHz. The desired output frequency is directed by a switch 22 into a power amplifier 24 and then through one of three series tuning capacitors C1, C2, C3 (depending upon the frequency selected) into the transmitter coil L1, which has a high enough Q to extract the fundamental sinusoidal component from the rectangular excitation.

The reference coil L2, which is inductively coupled to the coil L1, picks up a small portion of the signal generated by coil L1. The sinusoidal reference signal $e1$ is provided by coil L2 is detected by a detector 26 and the detected signal is then fed into a summing junction 27 where a reference voltage $e2$ provided by a reference voltage standard source 28 is subtracted therefrom. (Source 28 is constituted e.g. by a 5.6 volt temperature compensated zener diode and a resistor voltage divider network to provide an output of e.g. 1 volt. The resultant error signal $e3$ is fed to an integrator 30, and the integrator output is directed to a control point of the power amplifier 24 to control the gain of the amplifier.

The purpose of this arrangement is to maintain the magnetic moment of the transmitter coil L1 constant during changes in ambient temperature. This result is achieved as follows. The voltage $e1$ induced in the reference coil L2 is proportional to the mutual inductance $M_{12}$ between coils L1, L2. And the mutual inductance $M_{12}$ between coils L1, L2. And the mutual inductance $M_{12}$ is $k_{12}\sqrt{L_1 L_2}$ where $k_{12}$ is the coefficient of coupling between the coils and $L_1$, $L_2$ are the inductances of coils L1, L2. It can be shown that changes in $k_{12}$ for concentric coils is only a second order effect and therefore minimal over the normal ambient temperature range from −30° to +120° F. The inductances of coils L1, L2 are proportional to their areas (and to their number of turns squared, which is constant for a given pair of coils). Thus it can be said that $M_{12}$ is proportional to $\sqrt{A1\,A2}$ where A1, A2 are the areas of coils L1, L2 respectively. When a temperature change occurs, the areas A1, A2 will each change by substantially the same percentage, ignoring second order effects. Assume that the area change is 2 percent increase, for example. If A1, A2 each increase by 2 percent, then $M_{12}$ will also increase by 2 percent. In short, the mutual inductance $M_{12}$, and hence the voltage $e1$ induced in reference coil L2, will vary substantially linearly with variations in the area of coil L1.

Therefore, if the ambient temperature increases, the area of coils L1, L2 increases, the voltage $e1$ induced in coil L2 increases in proportion to the increase in area, the error signal $e3$ changes from zero to positive (for example) and the integrator output increases and reduces the gain of the amplifier. In this manner the magnetic moment of the transmitter coil L1 and thus the amplitude of the primary field are stabilized over a broad range of ambient temperatures.

In practice, the areas of coils L1, L2 will be very nearly the same, since both are of fairly large diameter, e.g. 22 inches (so that the coil housing can be placed around an operator's waist with the instrument housing 8 at his front), and since coil L2 is wound very close to coil L1 as shown in FIG. 2. Coil L2 may typically be 10 turns, and coil L1 148 turns.

The transmitter reference coil L2 is also used to supply a phase reference signal to the receiver. As shown in FIG. 3, the reference signal $e1$ is supplied to a zero crossing detector 31 which converts the signal into a square wave signal $e1'$ for delivery to an isolation transformer 32. From transformer 32, the signal $e1'$ is directed along the cable 10 to the receiver 4. The cable 10 is a twisted pair cable, to reduce any disturbing fields. In addition, the signal $e1'$ is very low level, e.g. of the order of about 60 millivolts, to minimize its interference with the measurements.

Figure 4:
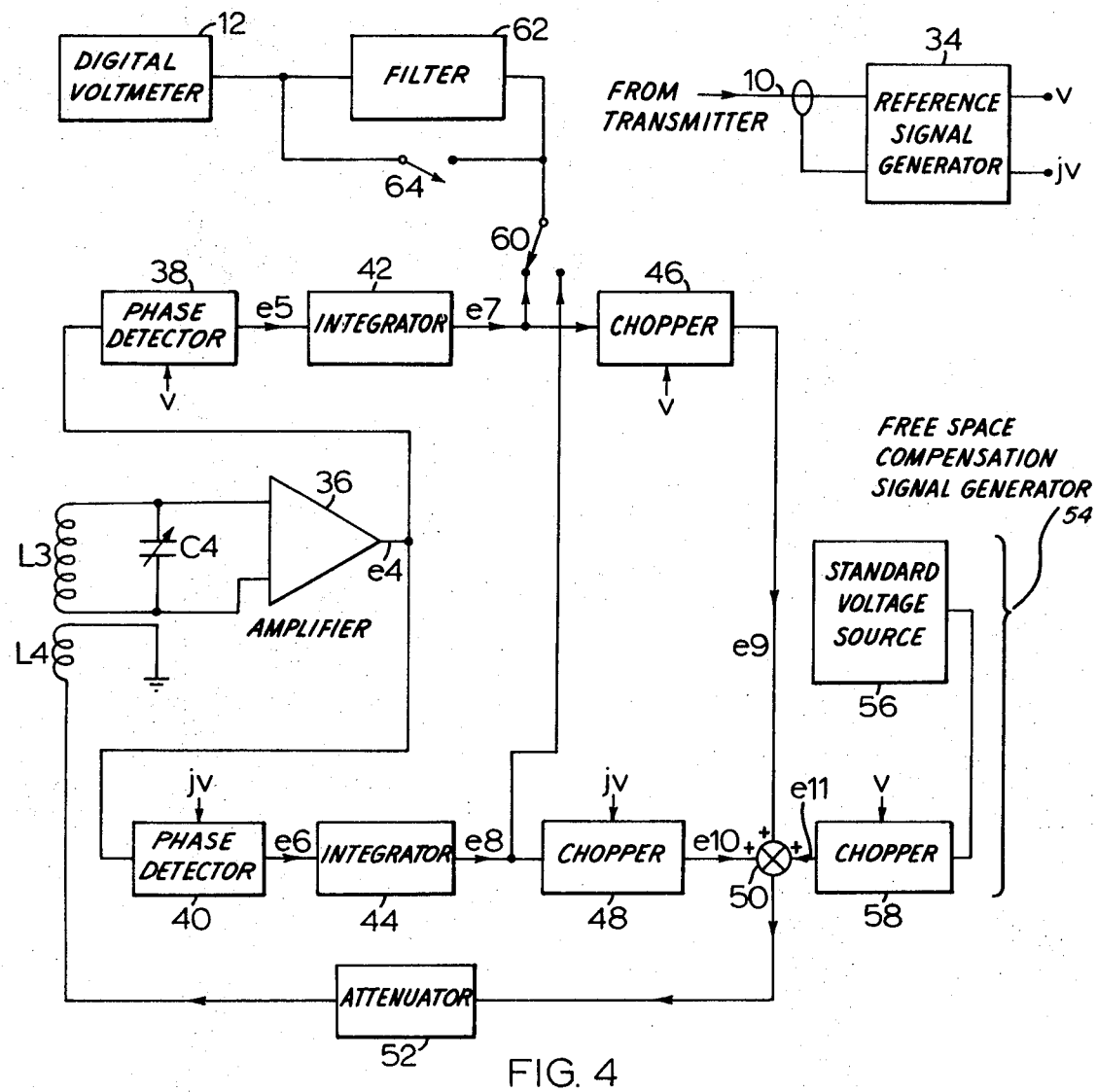
FIG. 4 is a block diagram of the receiver of FIG. 1.

Reference is next made to the receiver block diagram of FIG. 4. As shown, the reference signal $e1'$ from the cable 10 is fed to a reference voltage generator 34, where it is used to generate a square wave reference signal $v$ which is in time phase with the voltage induced across the timed receiver coil L3 by the primary magnetic field, and a square wave reference signal $jv$ which is 90° out of time phase with signal $v$. The signals $v, jv$ are used to control various parts of the receiver, as will be described.

The receiver coil L3 is tuned by a capacitance C4 (which is of course switchable depending on the frequency selected). The signal received by the receiver coil L3 is fed into a zero phase shift amplifier 36 to produce an output $e4$. The output $e4$ is split and fed into two digital phase detectors 38, 40, to which the signals $v, jv$ respectively are applied as references. Phase detector 38 provides an output $e5$ which is the amplified in-phase component of the signal received by receiver coil L3, while phase detector 40 provides an output $e6$ which is the amplified out-of-phase component of the signal received by coil L3.

The phase detector output signals $e5, e6$ are integrated in integrators 42, 44 to provide integrated output signals $e7, e8$. The signal $e7$ is chopped in a multiplier or chopper 46 to which signal $v$ is applied as a reference, to generate a chopped generally square wave signal $e9$ representing that portion of signal $e7$ that is in-phase with signal $e1$. The signal $e8$ is chopped in a multiplier or chopper 48 to which signal $jv$ is applied as a reference, to generate a chopped generally square wave signal $e10$ representing that portion of signal $e8$ that is out-of-phase with signal $e1$.

The signals $e9, e10$ are added in a summing junction 50, passed through an adjustable attenuator 52, and injected into the compensation coil L4 in a direction to reduce the signal induced in the receiver coil (and in the compensation coil) by the secondary field. Although the compensation signals are square waves, the tuned receiver coil will of course react only to the fundamental frequency.

In addition, a square wave free space compensation signal $e11$ is fed into the junction 50 and hence through the attenuator into the compensation coil L4. The signal $e11$ is produced by a generator 54, employing a 5.6 volt temperature compensated zener diode voltage standard source 56 having an internal resistor divider network to provide a 1 volt output. This 1 volt output directed into a multiplier or chopper 58 to which signal $v$ is applied as a reference.

When the system is to be used, the attenuator 52 will be set to a condition dependent upon the separation between the transmitting and receiving coils and the frequency used. This will set the resistances in the attenuator 52 such that the free space compensation signal $e11$, when it reaches the compensation coil L4, will induce in the receiving coil L3 a signal equal and opposite to the signal induced in the receiving coil by the free space component of the transmitted field. This cancels the effect of the free space component of the transmitted field. Since the receiver and compensation coils L3, L4 are wound concentrically, and are inductively coupled, the mutual inductance between them and hence the signal induced in coil L3 by coil L4 will vary in proportion to changes in their area caused by temperature changes. Therefore, variations in the free space receiver coil signal caused by temperature induced variations in receiver coil diameter will be substantially eliminated, as in the transmitter.

When the system is initially turned on, signals $e9$ and $e10$ will initially be zero, since the outputs of integrators 42, 44 will be zero. The signal generated by the receiving coil will be the sum of the in-phase and out-of-phase components caused by the secondary field normal to the plane of the receiver coil, and the phase detectors will separate these components and will produce DC voltages which will be integrated by the integrators. The integrator outputs will then increase, as will signals $e9, e10$, and the injection of signals $e9, e10$ back into the compensation coil will reduce the output of the receiver coil L3. This servo action will soon reduce the output of amplifier 36 to zero (in the absence of noise), at which time the DC outputs from the phase detectors 38, 40 will be zero. The outputs from the integrators 42, 44 will then cease changing and remain constant (since there is nothing further to integrate), and the compensation signals $e9, e10$ will also remain constant, so long as the in-phase and out-of-phase components induced in receiving coil L3 as a result of the secondary field do not change.

The outputs $e7, e8$ from the integrators 42, 44 are then a measure of the magnitude of the in-phase and out-of-phase components induced in coil L2 by the secondary field. Accordingly, the outputs from these integrators are displayed on the digital voltmeter 12. The voltmeter 12 is a standard voltmeter arranged to take continuous readings at preset intervals (e.g. every 1½ seconds) and to display these readings, so that if there are any changes in the outputs of the integrators, these changes will be displayed. A switch 60 is provided so that either the in-phase or out-of-phase component can be measured, and a long time constant filter 62 can be switched in series with the voltmeter by a switch 64, to reduce fluctuations in the output reading as will be described.

Figure 5:
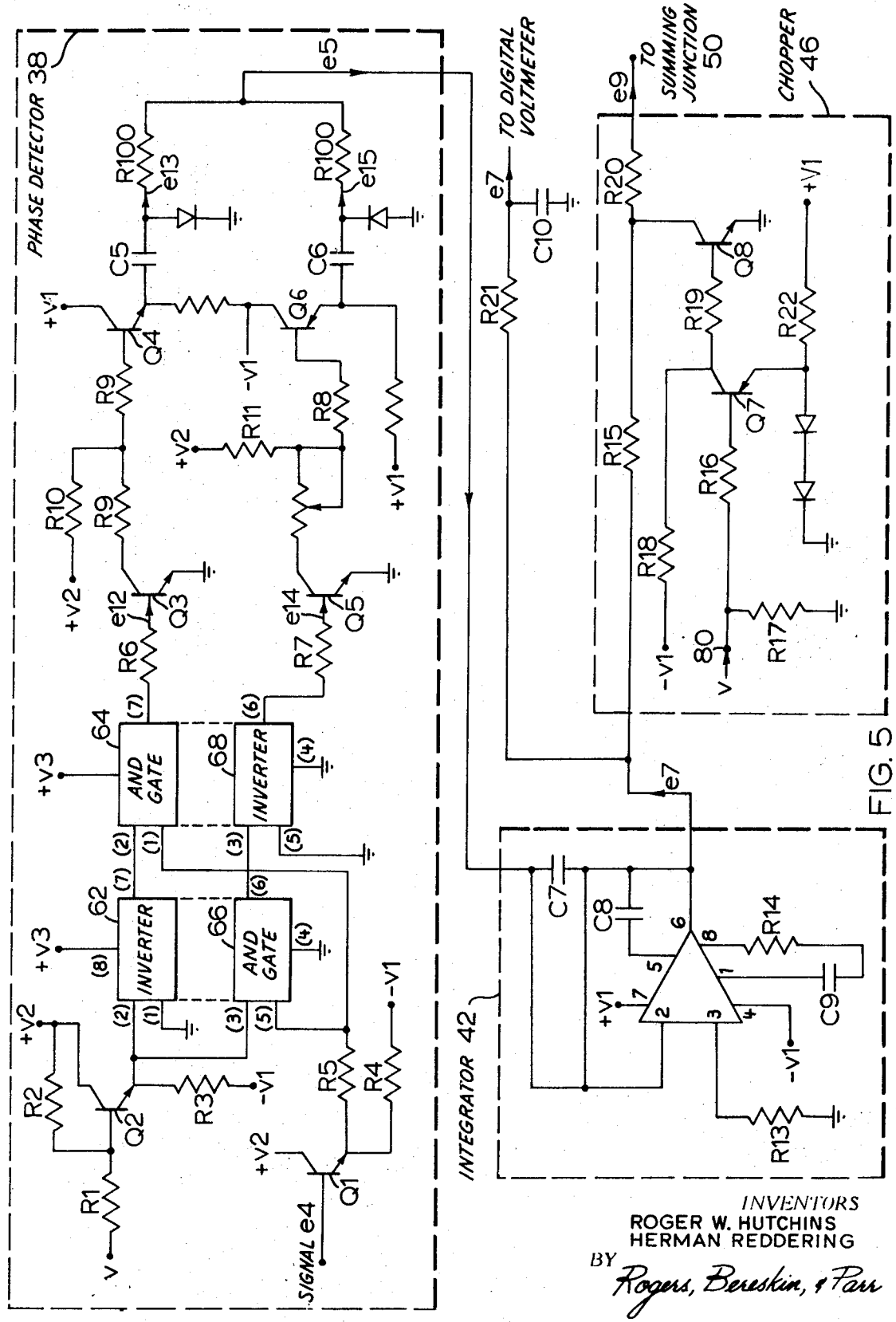
FIG. 5 is a more detailed diagram, partly in block form, of a portion of the receiver of FIG. 4.

A circuit diagram of phase detector 38, integrator 42 and chopper or multiplier 46 is shown FIG. 5. Illustrative values for the components shown in the drawing are given in Table 1 at the end of this description. The phase detector 38 includes two double Fairchild R.T.L. logic gates sold under their number 99147. The individual gate sections are numbered 62, 64, 66, 68 in the drawing, and the pin numbers shown by the manufacturer are shown in brackets beside the gates. Each gate 62, 64, 66, 68 contains identical components and is normally an AND gate, but one output of gates 62, 68 is connected to ground and these gates hence act as inverters having outputs which are the inverse of their inputs.

The signal $e4$ is applied via a transistor amplifier Q1 to inputs of gates 64, 66, while the reference signal $v$ is applied via another transistor amplifier Q2 to inputs of gates 62, 68. The reference signal $v$ is shown in FIG. 6a, and for purposes of explanation, FIG. 6b shows a square wave signal 70 which is assumed to be applied to the base of transistor Q1 as signal $e4$. (The actual signal $e4$ will of course be an amplified mixture of noise and the signal induced in the receiver coil by the secondary field and by the compensation coil L4).

The output from gate 64, indicated at $e12$ and shown in FIG. 6c, is a square wave train, with each positive excursion 72 occupying the period of time when signals $v$ and 70 are both in-phase and zero. The signal $e12$ is amplified by transistor Q3 and inverted by transistor Q4 to provide an output $e-13$ shown in FIG. 6e. Output $e13$ is a wave train of the same phase as signal $e12$ but inverted in polarity and swinging between zero and $-15$ volts.

Similarly, the output e14 (FIG. 6(d)) from gate 68 is a square wave train, with each positive excursion 74 occupying the time period when signals v and 70 are of opposite polarity and signal 70 is positive. The signal e14 is amplified by transistor Q5 and further amplified and clipped by transistor Q6 to swing between zero volts and +15 volts, providing an output signal e15 shown if n FIG. 6f. Signals e13 and e15 are added in resistors R100 to provide the detector output e5 of FIG. 4.

Figure 6:
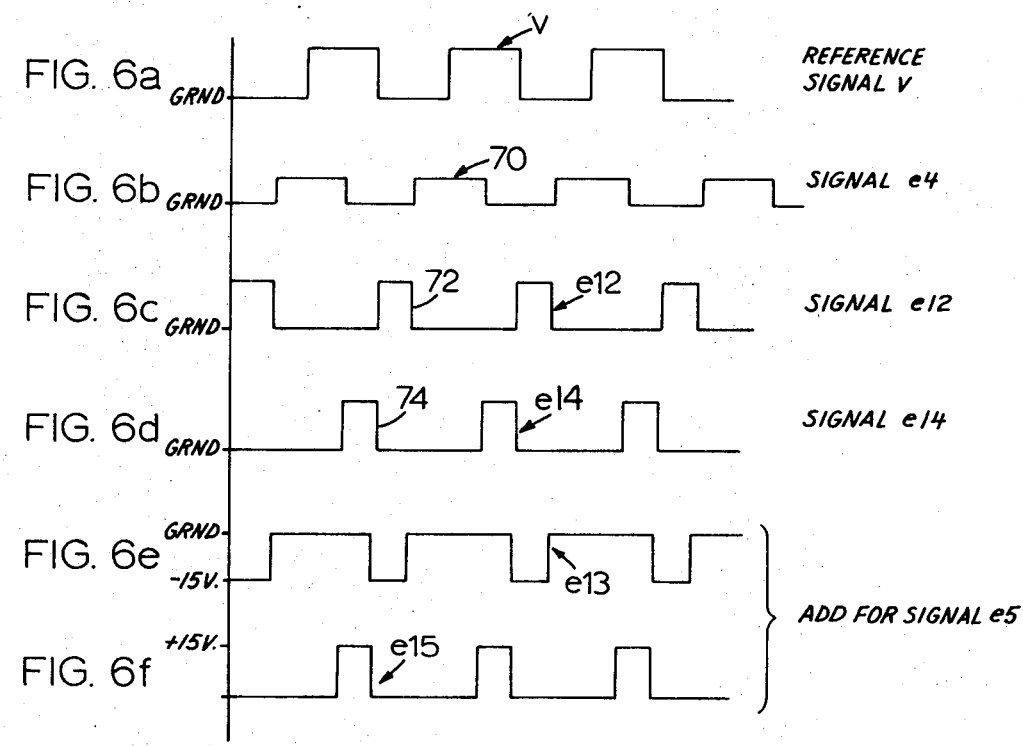
FIG. 6 is a waveform diagram illustrating operation of phase detectors of FIGS. 4 and 5.

It will be seen from FIG. 6 that if as much of the signal 70 is in-phase with reference signal v as is out-of-phase with the reference signal v (out-of-phase always means 90° out of phase), then outputs e13 and e15 will be equal and opposite and will cancel, and there will be no signal output from phase detector 38. However, in the other phase detector 40, the reference signal jv is shifted 90° with respect to signal v and will be entirely in-phase with signal 70 (or e4), and therefore one of the signals e13, e15 in the other phase detector 40 will vanish and a signal output will result. In both cases high frequency random noise will be substantially eliminated from the phase detector outputs, since such noise will contribute equally to signals e13 and e15 and will therefore cancel.

It will be noted that this method of phase detecting eliminates any need for switching the gain of amplifier 36 whenever the coil separation or operating frequency is changed. Instead, amplifier 32 is operated with sufficient amplification for the weakest expected signal (which occurs at maximum separation at the lowest frequency). Since enough amplification is provided for the weakest signal case, and since the prevailing noise is usually greater in amplitude that the weakest signal, the amplifier 36 in normally saturated and usually operates saturated. Because of this, the phase detecting in practice operates on the distribution of zero crossings of the signal e4. This distribution is random for noise but not for the signal. If the noise is small and the signal is large, then the signal predominates, and since the signal is not random, the outputs of the phase detectors 38, 40 are relatively high. If the noise is large in comparison to the signal, then the relatively small signal has less effect of the average of the zero crossings of the combined signal and noise, and the outputs of the phase detectors become smaller, thus effectively lowering the gain of the phase detectors. When the phase detectors have a lower gain, the system loop gain is lower, so that, as will be described, the time required to take a measurement becomes longer.

The integrator 40 which integrates output signal e5 from the phase detector 38 is shown in FIG. 5. Integrator 40 is a standard Fairchild model 709 operational amplifier connected as an integrator with a relatively long time constant, e.g. 0.7 seconds. The output e7 of the integrator is as shown directed into the multiplier or chopper 46, which comprises transistors Q7 and Q8 supplied with reference voltage v at terminal 80. Normally transistor Q7 is on, thus maintaining transistor Q8 on, and transistor Q8 then shunts signal e7 to ground. When reference signal v is applied to terminal 80 and goes positive, this shuts transistor Q7 and hence transistor Q8 off for the duration of the positive pulse, allowing the portion of signal e7 occuring during this interval to pass. The reference signal v is thus used as a chopping frequency for the phase detector output. The same conventional construction is used for modulators or choppers 48 and 58.

Figure 7:
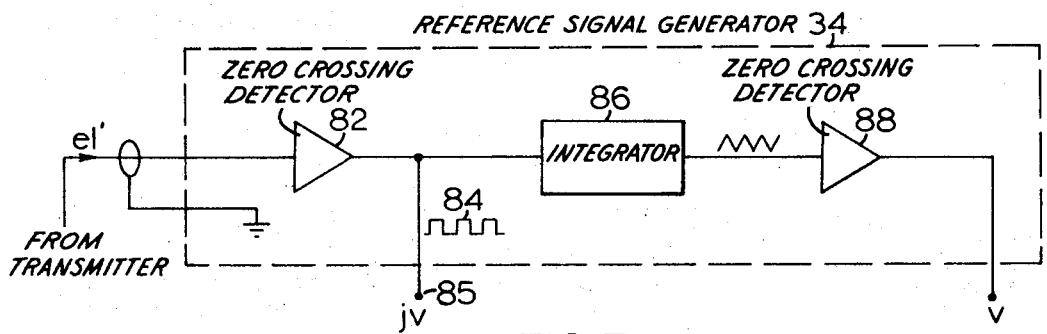
FIG. 7 is a block diagram illustrating a reference signal generator of FIG. 4.

Reference is next made to FIG. 7, which shows the reference signal generator 34 in more detail. The input to the reference signal generator 34 is the low level reference signal e1' from the transmitter, which signal is somewhat degraded by its passage through cable 10. The reference signal generator therefore contains a zero crossing detector 82 which reconstitutes and amplifies signal e1' into a square wave train 84 which is the reference signal jv. It will be noted that the voltage signal e1' induced in reference coil L2 is out-of-phase with the current in the transmitter coil, and since the voltage induced across the receiver coil due to the primary field is in-phase with the current in the transmitter coil, therefore signal e1' is out-of-phase with the voltage induced across the receiver coil due to the primary field. This is why the wave train 84 derived from signal e1—' is reference signal jv and not reference signal v.

The reference signal jv is made available at output terminal 85 for delivery to phase detector 40 and multiplier or chopper 48, and is also fed to an integrator 86 to produce a series of triangular waves. The triangle waves are then passed through a zero crossing detector 88 to form a square wave signal v which is 90° out-of-phase with the signal jv. The reference signals v, jv are thus generated in a manner independent of variations in the amplitude of the reference signal received from the transmitter. In addition, the reference signal generator, since it does not depend upon capacitance-resistance networks to obtain the 90° phase shift of signal jv from signal v, is capable of operating over the relatively wide range of frequencies typically used in the system.

Figure 8:
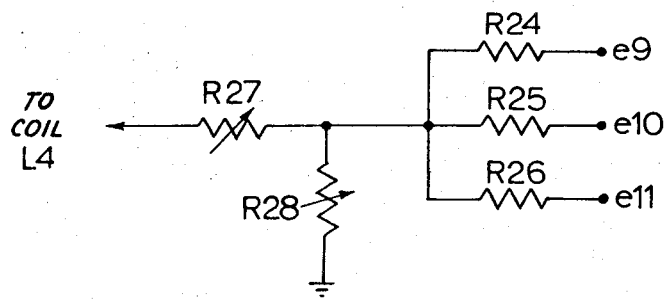
FIG. 8 is a block diagram of an attenuator of FIG. 4.

The summing junction 50 and attenuator 52 are shown in slightly more detail in FIG. 8. The signals e9, e10 and e11 are added in resistors R24, R25, R26 and are then shunted to ground by a switchable resistor R28, the resistance of which will be varied depending on the frequency chosen for the transmitter and receiver. The signal from the high side of resistor R28, is passed through another switchable resistor R27 to the compensation coil. The value of resistor R27 will be set according to the separation chosen between the transmitter and receiver coils L1, L3. The values of resistors R27, R28 will in all cases be such that the free space compensation signal e11, after passage through the attenuator and injection into the compensation coil, will be exactly that needed to cancel the calculated free space field at the receiver coil normal to the plane of the receiver coil. The calculated field is derived in a conventional manner from the parameters of the transmitter, including the frequency of transmission, and form the coil separation. The portion of signal e11 which remains after passing through attenuator 52 may be termed a cancellation signal, since it cancels the effects of the free space field at the receiver coil, i.e., it cancels the effects of that portion of the primary field present at the receiver coil.

The digital voltmeter 12 typically reads to three figures and is preferably calibrated so that if the only signal received by the receiver coil L3 were the free space signal, then the instrument would read 0.00 percent when measuring the in-phase signal and 0.00 percent when measuring the out-of-phase signal. To test the calibration, a testing facility is provided in the form of a switch diagrammatically indicated at 90 in FIG. 3. Switch 90 is operable by a pushbutton (not shown), and when it is operated, it switches the drive signal away from the input of the power amplifier and to the primary of the isolation transformer 32. In this way, a phase reference is supplied to the receiver for generation of the free space compensation signal, but there will be no primary field. Under these conditions the voltmeter 12 will for all frequencies and separations, if the instrument is properly calibrated, read −100 percent for the in-phase reading and 0.00 percent for the out-of-phase reading. If different readings are obtained by this test, then the need for adjustment is revealed.

It will be appreciated that in practice, the received field will induce a signal in compensation coil L4 as well as in coil L3. Since coil L4 has far fewer turns than does coil L3 (coil L4 may have 10 turns, and coil L3 592 turns), the signal induced in coil L4 by the received field will be relatively small and will have only a slight affect on coil L3. This signal might nevertheless affect the readings, but it is cancelled out by factory calibration of the instrument. The calibration is typically made by setting up the instrument in a test area where the readings are known and by making minor adjustments in the transmitter current for each frequency and coil separation combination until the correct readings occur. The transmitter contains adjustment resistors (not shown) for each coil separation and frequency combination, for this purpose.

Figure 9:
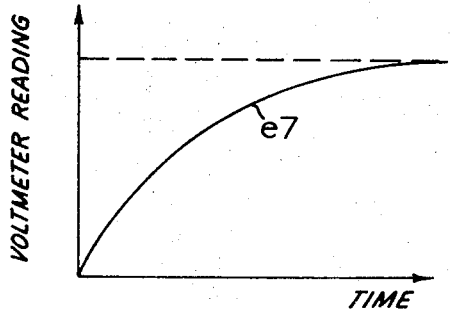

When the instrument is turned on for a reading, the digital voltmeter 12 will approach a reading in the manner shown in FIG. 9. In FIG. 9, the integrator 42 output $e7$ (for example), which the voltmeter 12 reads when switch 60 is in the in-phase position, is plotted against time. In the absence of noise, the reading will increase rapidly at first (assuming the presence of a secondary field), since the output of the phase detectors will be substantial, due to the unbalanced state of the system. As the compensation signal fed into the compensation coil increases and opposes a greater portion of the signal produced by the secondary field, the signal output of the receiver coil and hence the output of the phase detectors drops and becomes zero. The outputs of the integrators therefore level off and become constant, as shown in FIG. 9. Once the system is in a balanced state, only disturbances will produce positive or negative outputs which will adjust the level of the integrators until a new balance is reached. The digital voltmeter may be switched by the switch 60 to read either the in-phase or out-of-phase component, as discussed.

Figure 10:
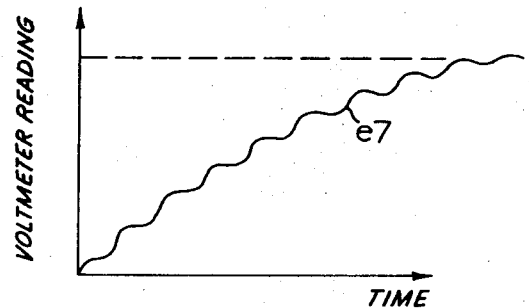
FIG. 10 is a view similar to FIG. 9 but showing a reading made in the presence of noise.

Ideally, the integrator outputs are steady DC levels, but if noise is present, then they will fluctuate because of the noise. The appearance of integrator 42 output $e7$ when noise is present and when the system is turned on is shown in FIG. 10. As shown, the signal $e7$ requires a longer time to reach an approximately steady state level, because the gain of the phase detector 38 is lowered by the presence of noise, and ripples are present even at steady state. These ripples will cause the readings on the digital voltmeter to fluctuate, and to reduce these fluctuations, the long time constant filter 62 (which has a time constant of e.g. 10seconds) can be switched in when desired. To reduce the long waiting time for such a filter, the filter switch 64 can be pushbutton which is pushed in after the instrument has reached an approximately steady state condition, to remove the ripples in the reading.

In the construction of the instrument, all parts will be well shielded to prevent radiation that might be picked up by the coils or by other parts of the circuit. The transmitter and receiver are each powered by batteries typically clipped below the instrument housing, and since it is difficult to shield the batteries thoroughly, the transmitter and receiver each preferably include a shunt regulated power supply (not shown) to ensure that the current drawn from the batteries is constant at all times, without ripples that might be picked up by the coils.

Because the instrument described is an absolute reading instrument, producing readings expressed as a percentage of the free space field, its readings can be readily used to provide data concerning the ground being surveyed. In addition, because the only reference information required at the receiver from the transmitter is phase information, a radio link can be used instead of a reference cable, and in addition, since the transmitter and receiver each have their own reference voltage standard sources, there is no need (apart from matching the reference voltage standards) for careful matching of the receiver to the transmitter, so that the receivers (for example) can be interchanged. Further, the reference from the transmitter to the receiver can be very low level, to minimize disturbance to the measurements. In addition, the system described is easily checked, by turning off the transmitter drive and supplying only the free space compensation signal to the receiver compensation coil L4, as discussed. Moreover, because the transmitter and receiver instrument housings are rigidly mechanically fixed in relation to the coils, variations in stray coupling between the coils and the other parts of the system are much reduced, permitting higher accuracy.

TABLE 1

| Component | Value or Type |
| --- | --- |
| R1, R13 | 47K |
| R2 | 560 K |
| R3, R4 | 100 K |
| R5 | 680 ohms |
| R6, R7, R8, R21 | 1 K |
| R9 | 470 ohms |
| R10, R11, R18 | 10 K |

TABLE 1—Continued

| R14 | 1.5 K |
| --- | --- |
| R15 | 3.3 K |
| R16, R17 | 8.2 K |
| R19 | 2.2 K |
| R20 | 6.7 K |
| R22 | 6.8 K |
| R100 | 100 K |
| C5, C6, C10 | 0.1 microfarads |
| C7 | 6.8 microfarads |
| C8 | 150 picofarads |
| C9 | 820 picofarads |
| Q1, Q2 | 2N3565 |
| Q3, Q4, Q5, Q6 | 2N3569 |
| Q7 | 2N3638A |
| Q8 | 2N1994 |
| V1 | 15 volts |
| V2 | 10 volts |
| V3 | 3.6 volts |

We claim:
1. A horizontal loop electromagnetic prospecting system comprising
   a. a transmitter including a tuned loop transmitting coil, for generating a primary magnetic field, said transmitter including oscillator and amplifier means connected to said transmitting coil for driving said transmitting coil,
   b. said transmitter including temperature stabilizing means for maintaining the amplitude of said primary field substantially independent of changes in ambient temperature said temperature stabilizing means comprising a reference coil inductively coupled to said transmitting coil for generating a reference signal representative of the field produced by said transmitting coil, means for providing a fixed reference voltage, means for comparing said reference voltage and said reference signal to produce an error signal, and means responsive to said error signal and coupled to said oscillator and amplifier means to vary the gain of the latter to maintain the magnetic moment of said transmitting coil substantially independent of temperature changes,
   c. and a receiver including
      i. a tuned loop receiving coil for generating a received signal dependent on the field received at said receiving coil,
      ii. a compensation coil inductively coupled to said receiving coil such that temperature induced changes in area of the receiving coil will cause corresponding changes in the mutual inductance between the compensation and receiver coils,
      iii. means for generating and feeding into said compensation coil a cancellation signal to oppose that portion of the received signal caused by the portion of said primary field at said receiver coil,
      iv. and means connected to said receiver coil for measuring substantially the remaining component of said received field in time phase with said primary field and for measuring substantially the component of said received field that is out of phase with said primary field.

2. A system according to claim 1 wherein said reference coil is coaxial with and of approximately the same diameter as said transmitting coil, and said compensation coil is coaxial with and of approximately the same diameter as said receiving coil.

3. A system according to claim 1 wherein said transmitter includes means for generating a reference signal of phase representative of the phase of said primary field, and means for transmitting said reference signal to said means (c.) (iii.) of said receiver to act as a phase reference for the generation of said cancellation signal, said means (c.) (iii.) including a voltage standard source, and means coupled to said voltage standard source and responsive to said reference signal for generating said cancellation signal.

4. A horizontal loop electromagnetic prospecting system comprising a. a transmitter, including a tuned loop transmitting coil, for generating a primary magnetic field,
b. said transmitter including means for maintaining the amplitude of said primary field substantially independent of changes in ambient temperature,
c. and a receiver including
  i. a tuned loop receiving coil for generating a received signal dependent on the field received at said receiving coil,
  ii. a compensation coil inductively coupled to said receiving coil such that temperature induced changes in area of the receiving coil will cause corresponding changes in the mutual inductance between the compensation and receiver coils,
  iii. means for generating and feeding into said compensation coil a cancellation signal to oppose that portion of the received signal caused by the portion of said primary field at said receiver coil,
  iv. and means connected to said receiver coil for measuring substantially the remaining component of said received field in time phase with said primary field and for measuring substantially the component of said received field that is out of phase with said primary field,
d. said transmitter also including means for generating a reference signal of phase representative of the phase of said primary field, and means for transmitting said reference signal to said means (c.) (iii.) of said receiver to act as a phase reference for the generation of said cancellation signal,
e. said means (c.) (iv.) including a self-nulling servoloop coupled between said receiving coil and said compensation coil, said servoloop including means for detecting the in-phase and out-of-phase components of said received signal, means for integrating such components, means for generating in-phase and out-of-phase signals from such integrated components, means for adding said in-phase and out-of-phase signals to form a sum signal, and means for injecting a predetermined portion of said sum into said compensation coil in a direction to reduce said received signal, and means for measuring the level of said integrated components.

5. A system according to claim 4 wherein said means for detecting the in-phase and out-of-phase components of said received signal comprise first and second phase detectors each coupled to said receiver coil, said means for integrating comprising first and second integrators coupled respectively to the outputs of said first and second phase detectors, said means for generating in-phase and out-of-phase signals from said integrated components comprising first and second multipliers connected respectively to the outputs of said first and second integrators for providing chopped outputs representative respectively of the in-phase and out-of-phase portions of the integrated signals from said integrators, said sum signal being the sum of said chopped signals.

6. A system according to claim 4 wherein said means for measuring said integrated components comprises a digital voltmeter.

7. A system according to claim 6 wherein said transmitter includes means for switching off transmission of said primary field while continuing generation of said reference signal to permit continued generation of said cancellation signal, and wherein said voltmeter is calibrated so that in the absence of transmission of said primary field but with continued generation of said cancellation signal, said voltmeter will read −100 percent when measuring the integrated in-phase component of said received signal and will read zero when measuring the integrated out-of-phase component of said received signal.

8. A system according to claim 5 wherein said means (c.) (iv.) further includes a digital voltmeter, and switching means for connecting said voltmeter to a selected one of the outputs of said integrators for measuring the output of either integrator.

9. A system according to claim 8 wherein said means for injecting a predetermined portion of said sum signal includes adjustable attenuator means for attenuating the amount of said sum signal injected into said compensation coil, said attenuator means being switchable to vary its attenuation dependent upon the frequency of said transmitter and the separation of said transmitter and receiver coils.

10. A system according to claim 9 wherein said phase detectors are digital phase detectors each of which provides an output which becomes smaller in amplitude as the size of the in-phase and out-of-phase components of said received signal becomes smaller relative to the noise in said received signal, and wherein said means (c.) (iv.) further includes a long time constant filter, and means for switching said filter in series with said voltmeter to reduce fluctuations in the readings of said voltmeter.

11. A system according to claim 9 wherein said transmitter includes means for switching off transmission of said primary field while continuing generation of said reference signal to permit continued generation of said cancellation signal, and wherein said voltmeter is calibrated so that in the absence of transmission of said primary field but with continued generation of said cancellation signal, said voltmeter will read −100 percent when measuring the integrated in-phase component of said received signal and will read zero when measuring the integrated out-of-phase component of said received signal.

12 electromagnetic prospecting system comprising:
1. a transmitter comprising
  a. a tuned loop transmitting coil for generating primary magnetic field,
  b. oscillator and amplifier means connected to said transmitting coil for driving said transmitting coil,
  c. and means for maintaining the amplitude of said primary field substantially independent of changes in ambient temperature,
  d. said means (c.) comprising
    i. a reference coil inductively coupled to said transmitting coil for generating a reference signal representative of the field produced by said transmitting coil,
    ii. and means coupled between said reference coil and said oscillator and amplifier means and responsive to said reference signal for varying the gain of said oscillator and amplifier means to maintain the magnetic moment of said transmitting coil substantially independent of said temperature changes,
2. and a receiver including
  a. a tuned loop receiving coil for generating a received signal dependent of the field received at said receiving coil,
  b. a compensation coil inductively coupled to said receiving coil such that temperature induced changes in area of the receiving coil will cause corresponding changes in the mutual inductance between the compensation and receiver coils,
  c. means for generating and feeding into said compensation coil a cancellation signal to oppose that portion of the received signal caused by the portion of said primary field at said receiver coil,
  d. and means connected to said receiver coil for measuring substantially the remaining component of said received field in time phase with said primary field and for measuring substantially the component of said received field that is out of phase with said primary field.

13. Apparatus according to claim 12 wherein said means (d.) (ii.) comprises means for providing a fixed reference voltage, means for comparing said reference signal with said fixed reference voltage to produce an error signal, and means responsive to said error signal and coupled to said oscillator and amplifier means to vary the gain of the latter.

14. Apparatus according to claim 12 wherein said reference coil is coaxial with and of approximately the same diameter as said transmitting coil.

15. Apparatus according to claim 12 wherein said reference coil is wound around said transmitting coil.